Figure 5:
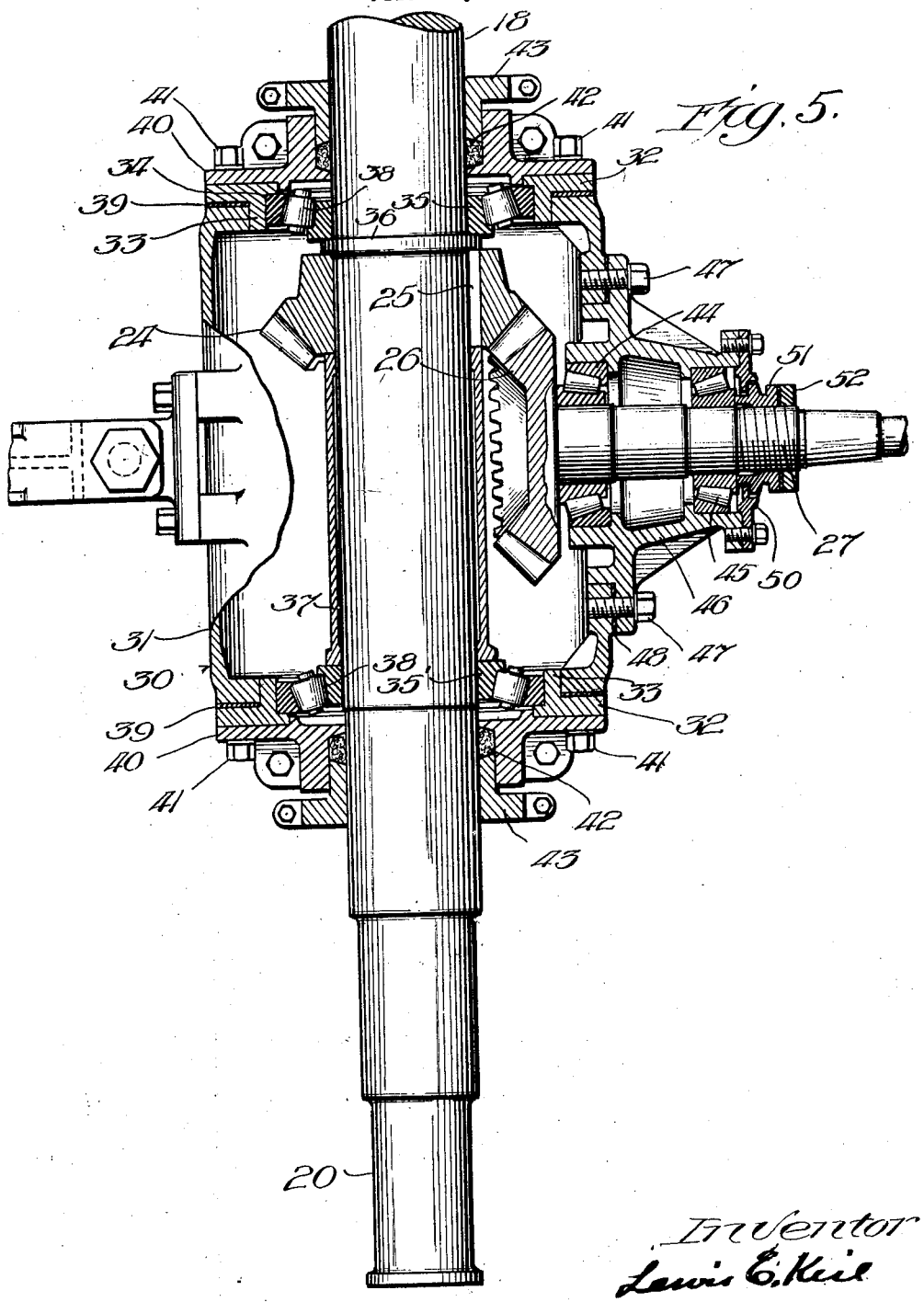

April 23, 1929.  L. E. KEIL  1,710,360
POWER TRANSMISSION MECHANISM FOR RAILROAD ROLLING STOCK
Filed May 14, 1926  4 Sheets-Sheet 1
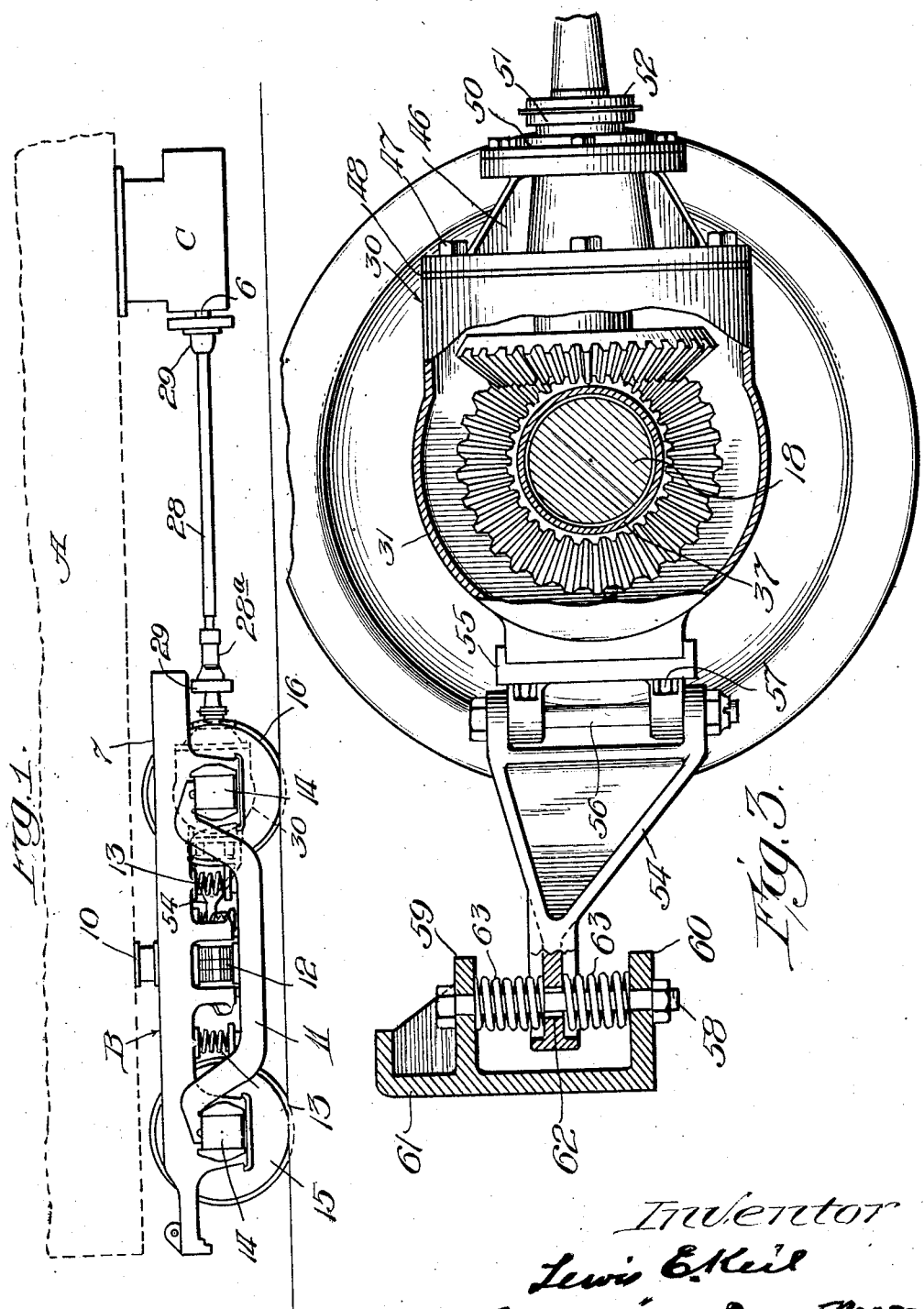
Inventor
Lewis E. Keil
Attys

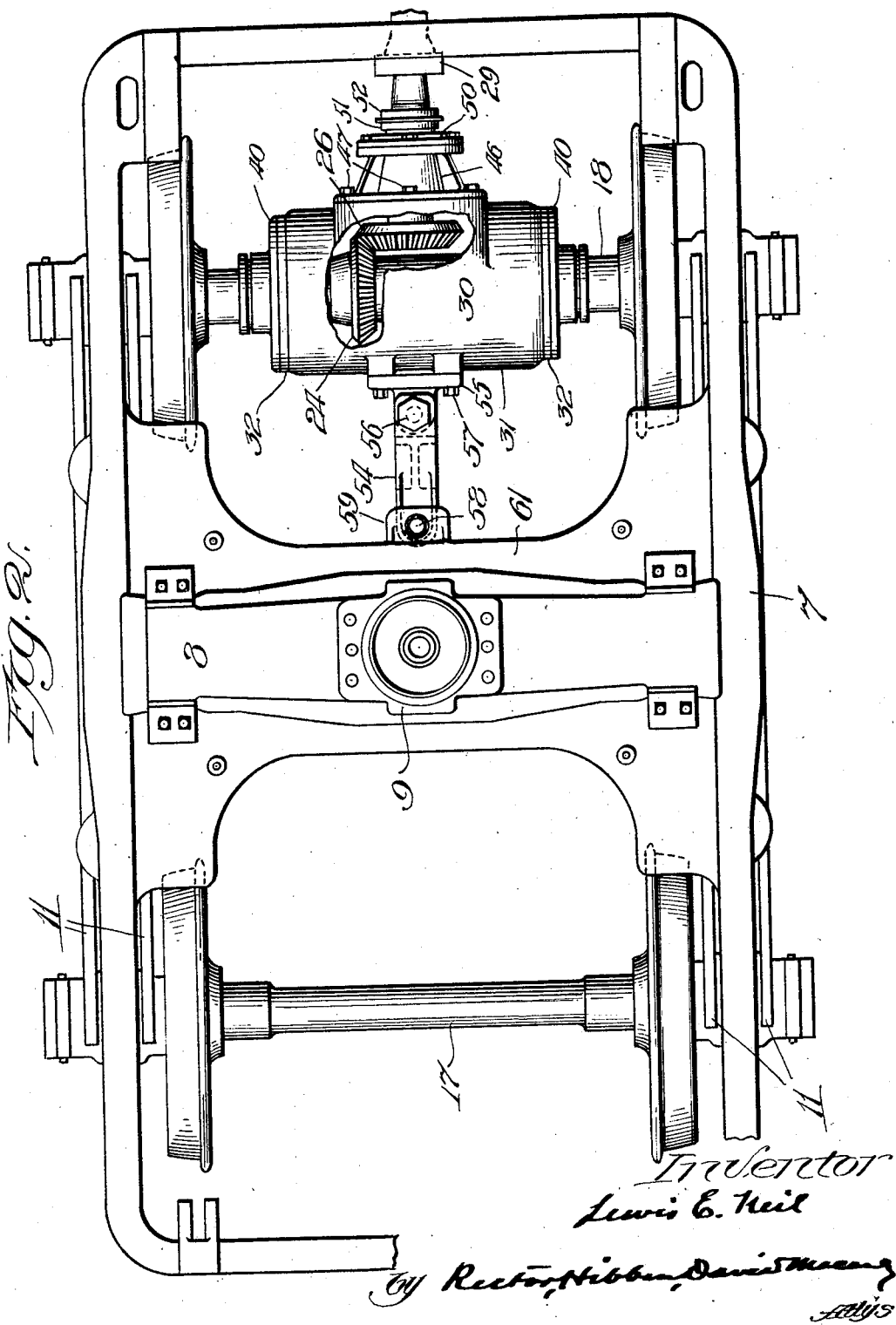

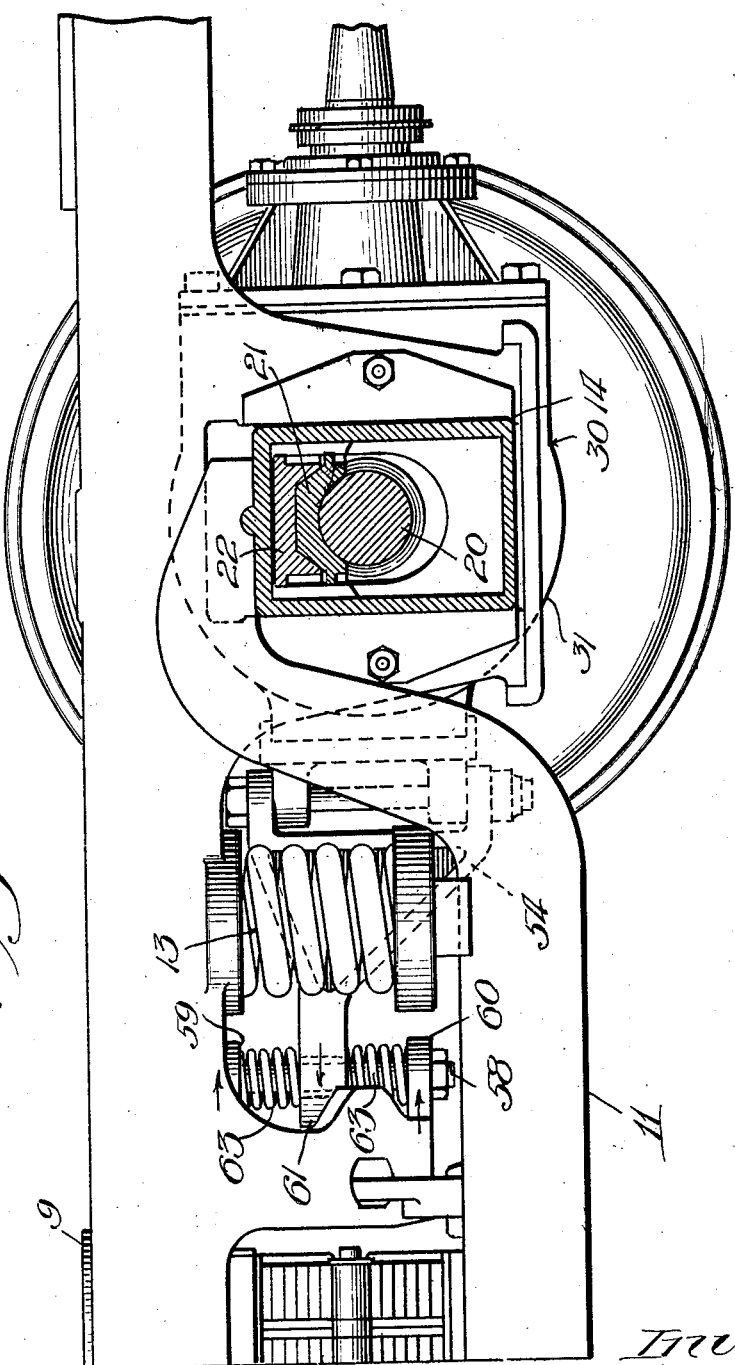

April 23, 1929.  L. E. KEIL  1,710,360
POWER TRANSMISSION MECHANISM FOR RAILROAD ROLLING STOCK
Filed May 14, 1926  4 Sheets-Sheet 4

Inventor
Lewis E. Keil
By Rector Hibben Davis and Macauley
Attys

Patented Apr. 23, 1929.

1,710,360

UNITED STATES PATENT OFFICE.

LEWIS E. KEIL, OF CHICAGO, ILLINOIS, ASSIGNOR TO RAILWAY LOCOMOTOR COMPANY, OF CHICAGO, ILLINOIS, A CORPORATION OF ILLINOIS.

POWER-TRANSMISSION MECHANISM FOR RAILROAD ROLLING STOCK.

Application filed May 14, 1926. Serial No. 109,172.

My invention concerns railway rolling stock including locomotives and cars of various kinds equipped with driving mechanism and power generators. The bodies of cars and locomotives of the class to which my invention relates, are supported on a pair of trucks, which, in general, are similar to the trucks upon which the usual locomotive drawn cars are mounted, but of which one or more of the pairs of wheels is driven by an engine mounted on the car body. In the construction to which my invention relates more specifically, the engine is mounted on the body below the same and power is transmitted therefrom to the axle of the driven wheels by suitable shafting and gearing.

In the drawings accompanying and forming a part of this specification, Figure 1 is a side elevation of an end of a car, the truck supporting the same and the driving engine, the car body being diagrammatically shown in dotted lines and the truck, wheels, driving engine and connections in full lines; Fig. 2 is a top plan view of the truck, partly broken away; Fig. 3 is a side elevation partly in vertical section on a plane through the axle of the driving wheels; Fig. 4 is a fragmentary view of a truck in side elevation, parts being shown in vertical section; and Fig. 5 a horizontal section through the gearing casing on the driving axle, parts being shown in elevation. Each part is identified by the same reference character wherever it occurs in the several views.

Referring first to Fig. 1, of the drawings, the body of the vehicle, which may be a passenger car, freight car, locomotive, or the like, is partly shown in dotted lines at A. The truck as an entirety is indicated at B and the engine at C. The engine may be of any desired or approved type driving a rotary shaft as shaft 6.

The truck is shown as comprising a frame 7, on which is mounted a bolster 8, having the usual center plate 9, on which the car body is mounted at 10. The frame is shown supported as usual on equalizer bars 11, through springs 12, 13. The ends of the equalizer bars, according to usual practice, rest at their respective opposite ends upon journal boxes 14, guided as usual in rectangular openings in depending portions of the truck frame. As usual in such truck construction there are two pairs of wheels 15, 16, secured to axles 17, 18, respectively, journaled in the journal boxes referred to above. The journals 20 of the axles as usual extend into the journal boxes and beneath pillow blocks 21 between which and the top wall of the journal boxes are interposed wedges 22.

As thus far described, the construction is, or may be, of usual character.

The axle and pair of wheels toward the end of the car are undriven and need be no further described.

The axle 18, of the inner pair of wheels, however, being the driven axle, is provided with a beveled gear 24 keyed thereto at 25. Said gear is in mesh with a gear 26, on a stub shaft 27, and the latter is connected by shaft 28 having a slip joint 28$^a$, and universal joints 29 with the shaft 6 of the engine above mentioned. The gears 24, 26 are surrounded by a casing 30, see Figs. 3 and 5, which is mounted by roller bearings upon the driving axle 18. The casing comprises a central barrel portion 31, fitted with end plates 32, which latter are formed about their respective central openings with cylindrical flanges 33, which fit snugly within openings of similar diameter formed in the ends of the barrel. Within the flanges 33 are mounted the outer races 34 of the roller bearing. The inner races 35, 35′ of the roller bearing are carried by the axle. The axle 18 is provided with a collar 36 for the purpose of properly locating the race 35 and gear 24 which fit snugly upon opposite sides thereof. A sleeve 37 of the proper length extends between the gear 24 and the race 35′ so that the latter is properly spaced from the race 35. The bearing rolls are shown at 38.

Intermediate the ends of the barrel and the end plates are gaskets 39. The central openings through the end plates are closed by stuffing box castings 40, bolted thereto at 41 and packed at 42. Glands 43 which may be of usual or approved type bear upon the packings.

The stub shaft 27 is mounted in roller bearings 44, 45 in a cover plate casting 46. The latter is bolted to the side of the barrel 31 at 47. A suitable gasket 48 secures a tight joint between the cover plate and the barrel. The outer end of the cover plate casting is closed about the shaft by any suitable means as an annulus 50 bolted thereto, a collar 51 on the shaft, and a nut 52.

In order to maintain the casing in position and prevent it turning about the axle 18, and for other purposes which will appear, I provide a torque bar or casting 54. The latter is pivoted to a bracket plate 55 by means of a hinge bolt 56, extending through ears upon the torque rod and bracket plate, respectively, and the latter is bolted at 57 to the casing which is formed with flat seats for the purpose. The outer or free end of the torque rod or casting 54 engages a draft bolt 58, secured between flanges 59, 60 of the truck transom 61, see particularly Fig. 3 of the drawing.

The torque bar is formed with an opening 62 through which the draft bolt 58 extends loosely and on opposite sides of the torque bar and between the same and the respective flanges of the truck transom are compressed shock springs 63 coiled about the draft bolt.

The springs are so designed and mounted as to provide a play for the end of the torque bar of about a half inch, preferably, so that a very limited movement of the gear casing or housing about the axle 18 is permitted, at the end of which movement in either direction the torque bar is stopped and thus prevents further turning of the housing. The springs, however, absorb shock caused by the passing of the wheels over rail joints and the like. It may be mentioned that provision against excessive rotation of the housing is necessary to avoid cramping of the universal joints 29 and shaft 28. A further function of the torque bar is to maintain the journals of the driven axle in proper relation to the journal bearing. The journal bearings, as before described, are of the usual type and there is a tendency due to the driving effort between the wheels of the driven axle and the rails to cause the axle to ride up from under the journal bearings out of its central position therein. This movement, however, is limited by the torque bar bearing at one end against the draft bolt and at the other end against the bolt by which it is attached to the housing, in which housing the axle is accurately mounted by the roller bearing. Furthermore, the pivoting of the torque bar at its ends as described permits the slight movement of the axle transversely of the truck which is incident to such constructions. The pivoting of the torque bar on the casing also permits the ready assembling and disassembling thereof as the torque bar may be readily swung to one side or the other after removing the draft bolt.

I claim:

1. In a truck for a car of the class described and in combination with the frame, axles and wheels thereof, means for driving one of said axles, journal boxes mounted to slide in said frame and into which the journals of said driven axle extend, pillow blocks on the journals of said axle within the journal boxes, a member journaled on said driven axle independently of the truck, a bar attached to said member and to a non-rotary part of the truck and adapted to limit movement of said axle horizontally with respect to the pillow block.

2. In a truck for a car of the class described and in combination with the frame, axles and wheels thereof, means for driving one of said axles comprising a gear mounted thereon, a second gear in mesh with the first named gear and a shaft on which the said second gear is mounted, a housing enclosing said gear journaled upon the said axle and in which said shaft is journaled, a torque bar pivoted on said housing, the free end of said torque bar being provided with an opening, a draft bolt mounted in the truck transom and extending through the opening in the torque bar, springs mounted on the respectively opposite sides of the torque bar, surrounding the draft bolt and so supported as to yieldingly maintain the torque bar in an intermediate position with respect to said bolt.

3. In a truck for a car of the class described and in combination with the frame, axles and wheels thereof, means for driving one of said axles comprising a gear mounted thereon, a second gear in mesh with the first named gear, a shaft on which the said second gear is mounted, means for driving said shaft, a housing enclosing said gears journaled upon the said axle and in which said shaft is journaled, a torque bar vertically pivoted to said housing at one end, the other end of said bar being loosely connected to the frame to permit a slight vertical movement thereof, and springs intermediate the frame and torque bar for normally maintaining the latter in an intermediate position.

In testimony whereof, I have subscribed my name.

LEWIS E. KEIL.